United States Patent
Al Sayeed (10) Patent No.: US 10,439,709 B1
(45) Date of Patent: Oct. 8, 2019

(54) HANDLING CHANNEL HOLDER FAILURES IN CHANNEL HOLDER EQUIPPED OPTICAL LINKS

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/285,407

(22) Filed: Feb. 26, 2019

(51) Int. Cl.
H04B 10/03 (2013.01)
H04J 14/02 (2006.01)
H04Q 11/00 (2006.01)

(52) U.S. Cl.
CPC ............ H04B 10/03 (2013.01); H04J 14/021 (2013.01); H04Q 11/0005 (2013.01); H04Q 2011/0016 (2013.01); H04Q 2011/0043 (2013.01)

(58) Field of Classification Search
CPC ... H04B 10/03; H04J 14/021; H04Q 11/0005; H04Q 2011/0016; H04Q 2011/0043
USPC .......................................................... 398/2
See application file for complete search history.

(56) References Cited

U.S. PATENT DOCUMENTS

| | | | |
|---|---|---|---|
| 5,959,749 A * | 9/1999 | Danagher | H04J 14/0212 385/24 |
| 6,031,647 A | 2/2000 | Roberts | |
| 6,304,347 B1 | 10/2001 | Beine et al. | |
| 6,404,525 B1 * | 6/2002 | Shimomura | H04B 10/03 398/82 |
| 6,959,149 B2 | 10/2005 | Bragg et al. | |
| 7,483,205 B1 | 1/2009 | Lundquist et al. | |
| 8,126,330 B2 * | 2/2012 | Wisseman | H04J 14/0212 398/2 |
| 8,509,621 B2 | 8/2013 | Boertjes et al. | |
| 8,909,038 B2 | 12/2014 | Cannon et al. | |
| 8,971,705 B2 | 3/2015 | Boertjes et al. | |
| 9,197,322 B2 | 11/2015 | Boertjes et al. | |
| 9,252,913 B2 | 2/2016 | Al Sayeed et al. | |
| 9,276,696 B2 | 3/2016 | Ai Sayeed et al. | |
| 9,344,191 B2 | 5/2016 | Al Sayeed et al. | |
| 9,419,708 B2 | 8/2016 | Rad et al. | |
| 9,768,902 B2 | 9/2017 | Al Sayeed et al. | |
| 9,906,294 B2 | 2/2018 | Al Sayeed et al. | |
| 9,985,726 B1 | 5/2018 | Al Sayeed et al. | |
| 2010/0008672 A1 * | 1/2010 | Kovsh | H04J 14/0204 398/85 |
| 2011/0200322 A1 * | 8/2011 | Kovsh | H04J 14/0209 398/2 |

(Continued)

Primary Examiner — Dalzid E Singh
(74) Attorney, Agent, or Firm — Clements Bernard Walker PLLC; Christopher L. Bernard; Lawrence A. Baratta, Jr.

(57) ABSTRACT

An Optical Add/Drop Multiplexer (OADM) node includes a plurality of degrees each having a multiplexer and a demultiplexer configured to interface to an optical section in an optical network; one or more channel holder sources configured to connect to corresponding multiplexers of the plurality of degrees and provide optical power at unoccupied portions of optical spectrum on the corresponding optical section to present a full-fill loading condition thereon; and control circuitry configured to locally detect a failure on the one or more channel holder sources affecting an upstream degree, and switch unoccupied optical spectrum filled with the channel holder signals from one or more downstream degrees to the upstream degree.

20 Claims, 6 Drawing Sheets

(56) References Cited

U.S. PATENT DOCUMENTS

2014/0133850 A1\* 5/2014 Birk ................ H04B 10/03
398/34
2018/0234749 A1\* 8/2018 Chedore ............ H04Q 11/0005

\* cited by examiner

HANDLING CHANNEL HOLDER FAILURES IN CHANNEL HOLDER EQUIPPED OPTICAL LINKS

FIELD OF THE DISCLOSURE

The present disclosure generally relates to optical networking. More particularly, the present disclosure relates to systems and methods for handling channel holder failures in channel holder equipped optical links.

BACKGROUND OF THE DISCLOSURE

Optical networks include nodes interconnected by optical links formed by fiber optic cables including various pre-amplifiers, post-amplifiers, and optional intermediate line amplifiers. Various power control techniques are utilized to control optical power through the various amplifiers, over the optical links. A technique to deal with the control optical power involves the use of so-called channel holders which can include Amplified Stimulated Emission (ASE) sources, modulated lasers, unmodulated lasers, etc. Channel holders are used in optical links to keep optical spectrum in full-fill loading condition so that any capacity change activity can be digitally handled by switching the channel holders with traffic signals. Failure of the channel holder source is expected to be service impacting for existing in-service traffic signals. A power offset (undershoot or overshoot) is expected for existing in-service traffic signals in case of channel holder failure, depending on signals' spectral location, and the ratio of power is being lost due to Stimulated Raman Scattering (SRS), amplifier tilt, Spectral Hole Burning (SHB), and amplifier ripple effects.

To avoid channel holder failure, the typical approach is to place another redundant channel source such that optical power (e.g., ASE power) is combined from both sources, so if one has a failure, then the total optical power only drops by roughly 3 dB, until a local optical controller provides additional power from another source. Disadvantageously, this approach is expensive in cost, power, and real estate as it requires an additional channel holder generator and a passive combiner at every Optical Add/Drop Multiplexer (OADM) switch point for a channel holder-based optical link. Also, this approach does not cover the partial hardware failure case where a part of the spectrum from one source dies due to internal pump failures. In such a case, the second source certainly helps, but it still cannot fully recover the lost power in the spectrum on the line system.

Also, to avoid fiber breaks or pinches between the channel holder source and the OADM multiplexer switch, the channel holders are typically now made in-skin (integrated within the same circuit pack as the OADM multiplexer switch). This approach ensures the fiber and connectors are not exposed outside of the OADM multiplexer switch circuit pack, and reduces any chances for external fiber breaks/pinches.

BRIEF SUMMARY OF THE DISCLOSURE

The present disclosure addresses channel holder source failure in channel holder equipped optical links. Specifically, the present disclosure addresses how to detect silent or partial channel holder failures, and how to recover the impacted existing in-service channels. The recovery is local to a node, i.e., without requiring or relying on end-to-end communication between other nodes in an optical link. Further, the recovery is with local resources without additional hardware and 1+1 protection. Finally, the recovery is fast to avoid any downtime in the impacted existing in-service channels.

In an embodiment, an Optical Add/Drop Multiplexer (OADM) node includes a plurality of degrees each having a multiplexer and a demultiplexer configured to interface to an optical section in an optical network; one or more channel holder sources configured to connect to corresponding multiplexers of the plurality of degrees and provide optical power at unoccupied portions of optical spectrum on the corresponding optical section to present a full-fill spectral loading condition thereon; and control circuitry configured to locally detect a failure on the one or more channel holder sources affecting a downstream degree, and cause a switch of unoccupied optical spectrum filled with the channel holder signals from one or more upstream degrees to the downstream degree. The control circuitry can locally detect the failure that is a full failure based on a loss of light at an input port of one of the corresponding multiplexers. The control circuitry can locally detect the failure that is a partial failure by correlating total power change on degree line fiber facing output with a power delta measured at a switch input port of one of the corresponding multiplexers coming from the one or more channel holder sources.

The control circuitry can switch the unoccupied optical spectrum filled with the channel holder signals from the one or more upstream degrees to the downstream degree in a controlled power ramp to achieve a target launch profile. The one or more upstream degrees can be a plurality of upstream degrees, and wherein the control circuitry can switch the unoccupied optical spectrum filled with the channel holder signals from the plurality of upstream degrees to the downstream degree in a diversified manner. The OADM node can have N degrees with N≥2, the failure causes missing channel holder signals for X GHz, the one or more upstream degrees are N−1 degrees, and an expected spectral allocation from the N−1 degrees is $$\frac{X}{N-1} \text{ GHz.}$$

The one or more channel holder sources can be any of Amplified Stimulated Emission (ASE) sources, modulated lasers, and unmodulated lasers. When a faulted channel holder source is replaced, the control circuitry can be configured to check if the replaced channel holder source is reporting any fault and meeting expected total power at switch input port of the multiplexer, and then cause a switch back from the one or more upstream degrees to the replaced channel holder source by applying bundling.

In another embodiment, a method includes locally detecting a failure on one or more channel holder sources affecting an downstream degree in an Optical Add/Drop Multiplexer (OADM) node, wherein the one or more channel holder sources are configured to connect to corresponding multiplexers of degrees in the OADM node and provide optical power at unoccupied portions of optical spectrum on an optical section to present a full-fill loading condition thereon; and switching unoccupied optical spectrum filled with the channel holder signals from one or more upstream degrees to the downstream degree. The locally detecting the failure that is a full failure can be based on a loss of light at an input port of one of the corresponding multiplexers. The locally detecting the failure that is a partial failure can include correlating total power change on degree line fiber facing output with a power delta measured at an input port of one of the corresponding multiplexers coming from the one or more channel holder sources. The switching the unoccupied optical spectrum filled with the channel holder signals from the one or more upstream degrees to the downstream degree can utilize a controlled power ramp to achieve a target launch profile.

The one or more upstream degrees can be a plurality of upstream degrees, and wherein the switching the unoccupied optical spectrum filled with the channel holder signals from the one or more upstream degrees to the downstream degree is in a diversified manner. The OADM node can have N degrees with N≥2, the failure causes missing channel holder signals for X GHz, the one or more upstream degrees are N−1 degrees, and an expected spectral allocation from the N−1 degrees is $$\frac{X}{N-1} \text{ GHz}.$$

The one or more channel holder sources can be any of Amplified Stimulated Emission (ASE) sources, modulated lasers, and unmodulated lasers. The method can further include replacing a faulted channel holder source; checking if the replaced channel holder source is reporting any fault and meeting expected total power at switch input port of the multiplexer; and causing a switch, based on the checking, back from the one or more upstream degrees to the replaced channel holder source by applying bundling.

In a further embodiment, an apparatus includes control circuitry in an Optical Add/Drop Multiplexer (OADM) node configured to communicate to i) a plurality of degrees each having a multiplexer and a demultiplexer configured to interface to an optical section in an optical network, and ii) one or more channel holder sources configured to connect to corresponding multiplexers of the plurality of degrees and to provide optical power at unoccupied portions of optical spectrum on the corresponding optical section to present a full-fill loading condition thereon, wherein the control circuitry is configured to locally detect a failure on the one or more channel holder sources affecting an downstream degree, and cause a switch of unoccupied optical spectrum filled with the channel holder signals from one or more upstream degrees to the downstream degree. The control circuitry can locally detect the failure that is a full failure based on a loss of light at an input port of one of the corresponding multiplexers. The control circuitry can locally detect the failure that is a partial failure by correlating total power change on degree line fiber facing output with a power delta measured at an input port of one of the corresponding multiplexers coming from the one or more channel holder sources. The control circuitry can switch the unoccupied optical spectrum filled with the channel holder signals from the one or more upstream degrees to the downstream degree in a controlled power ramp to achieve a target launch profile.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

In various embodiments, the present disclosure relates to systems and methods for handling channel holder in channel holder equipped optical links. The present disclosure focuses on recovering from the loss of channel holders as soon as possible locally without relying on any end-to-end communications or any centralized controller running over the optical link, or any additional hardware for 1+1 protection. More precisely, the systems and methods focus on replacing missing ASE spectrum on a local degree of a node by switching carved ASEs from optically interconnected upstream degrees. In order to reduce dependency on a single upstream degree, the systems and methods further diversify the upstream sources for ASE replacement if more degrees are optically interconnected within the node.

The systems and methods include a local, in-skin, nodal solution to recover following a channel holder failure, which can be severe traffic impacting on existing in-service channels in channel holder-based optical links. The systems and methods reduce the need for additional hardware for 1+1 protection and, instead, the systems and methods take advantage of unused ASE presence on upstream degrees. Further, the systems and methods figure out locally which spectrum is available from upstream degrees for use for ASE replacement in a downstream degree, without relying on any centralized or local database for channel topology or logical spectral map/cross-connect information.

Optical Network

Figure 1:
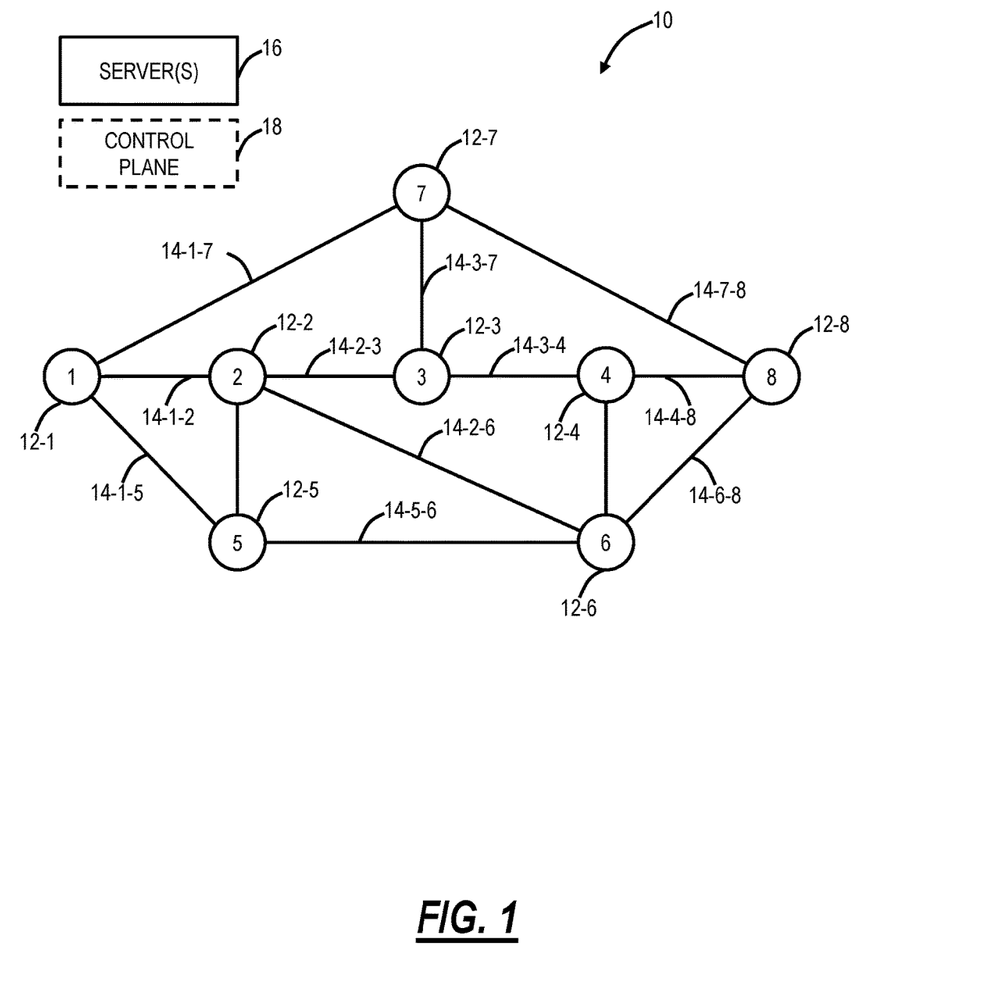
FIG. 1 is a network diagram of an optical network.

FIG. 1 is a network diagram of an optical network 10. The optical network 10 includes nodes 12, labeled as nodes 12-1-12-8, interconnected to one another via links 14 which physically can include one or more optical fibers. The nodes 12 can also be referred to as network elements and can include, without limitation, Wavelength Division Multiplex (WDM) terminals, Dense WDM (DWDM) terminals, Optical Add/Drop Multiplexers (OADMs), Reconfigurable OADMs (ROADMs), optical cross-connects, optical switches, Packet-Optical Transport Systems (POTS), routers, switches, and the like. In various embodiments, the nodes 12 include various hardware and software to communicate with one another via wavelengths as well as optionally digital communication via timeslots, packets, etc. At a physical layer, the nodes 12 provide one or more wavelengths between one another over the links 14. Note, while FIG. 1 shows a single node 12 at each location, there can be multiple devices or network elements providing multiple wavelengths. For illustration purposes, each of the links is labeled as link 14-X-Y where X and Y are the nodes interconnected by the links 14.

The optical network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automated allocation of network resources in an end-to-end manner. Examples of control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route channels and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

The optical network 10 has a mesh architecture. Each of the links 14 is an Optical Multiplex Section (OMS) section, and each link 14 can include various amplifiers including pre-amplifiers, post-amplifiers, and intermediate line amplifiers (these are omitted in FIG. 1 for illustration purposes). Of note, the OMS sections can have different fill levels in terms of occupied channels or spectrum, which is the purpose of channel holders—to present a full-fill loading condition. For example, a wavelength #1 can be routed from node 12-1 to node 12-8 via the node 12-7 and a wavelength #2 can be routed from node 12-1 to node 12-3 via the node 12-7. Thus, the wavelengths #1, #2 share the link 14-1-7. As one of ordinary skill can appreciate, various other wavelengths can also be equipped such that the links 14 can have various different fill levels. Further, the wavelengths #1, #2 traverse an intermediate OADM at the node 12-7, thus this is said to be a cascaded optical network as different wavelengths can traverse multiple OMS sections (links 14).

Figure 2:
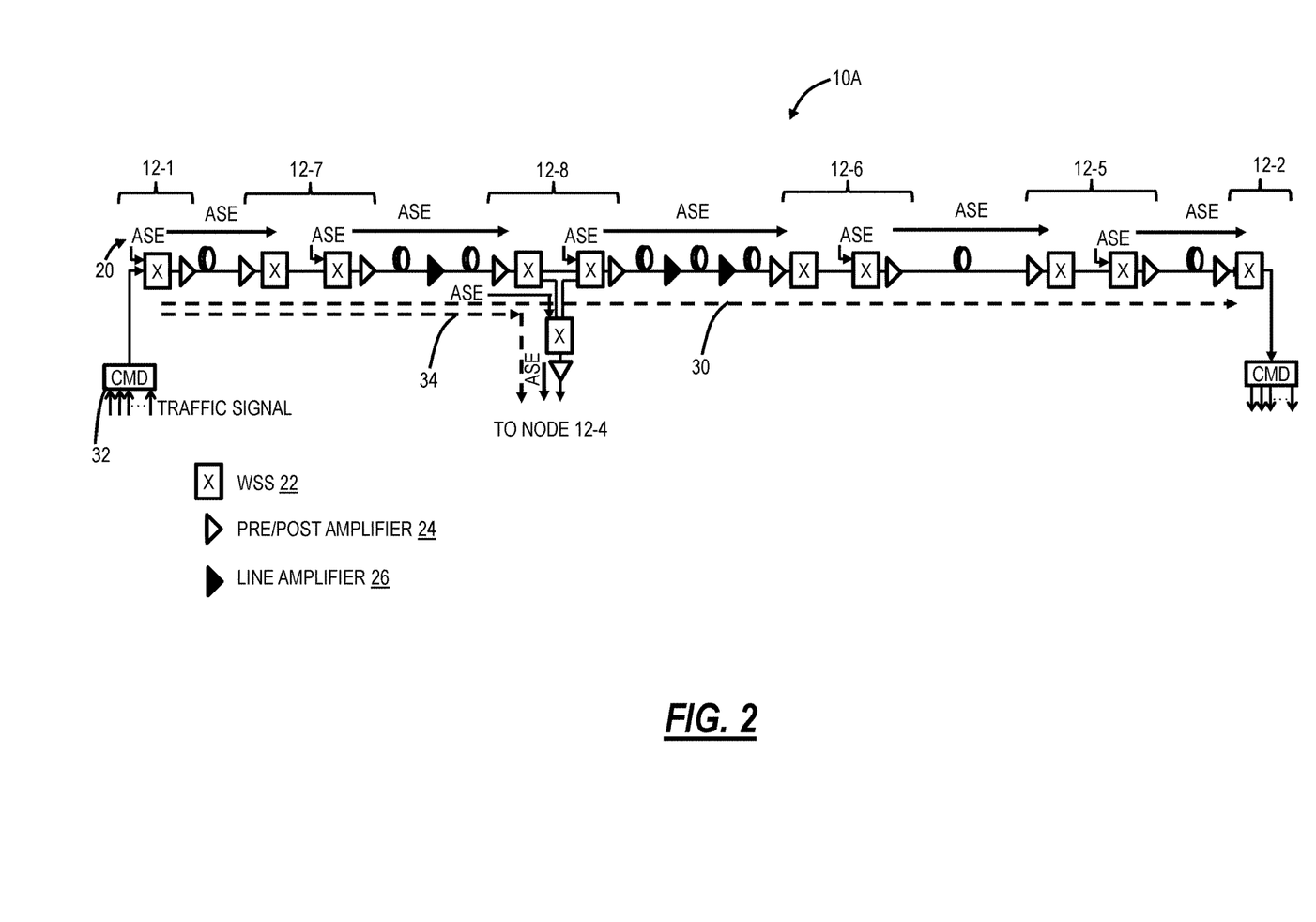
FIG. 2 is a network diagram of a portion of the optical network of FIG. 1 illustrating additional details for describing the use of channel holders.

FIG. 2 is a network diagram of a portion 10A of the optical network 10 illustrating additional details for describing the use of channel holder sources 20. For illustration purposes, the portion 10A is shown in a unidirectional configuration from the node 12-1 to the node 12-2 with intermediate nodes 12-7, 12-8, 12-6, 12-5 and a branching degree from the node 12-8 to the node 12-6. Those of ordinary skill in the art will recognize a practical embodiment includes complementary equipment in the opposite direction to form bidirectional connectivity. The nodes 12 include Wavelength Selective Switches (WSS) 22 for each degree, pre/post amplifiers 24, and some of the links 14 include line amplifiers 26. Note, the WSS 22 can generally be defined as an OADM device/OADM multiplexer circuit pack, namely other degree forming components are also contemplated. For illustration purposes, a traffic signal 30 is shown between the node 12-1 and the node 12-2 and the traffic signal is added/dropped via a multiplexer/demultiplexer 32. Another traffic signal 34 is shown between the node 12-1 and through the node 12-8 to the node 12-6. Note, at the node 12-1, the traffic signals 30, 34 are added together at the multiplexer/demultiplexer 32, but these signals 30, 34 are separated at the node 12-8.

The channel holder sources 20 can be injected at each WSS 22 in the multiplexer direction to replicate a channel's signal spectral shape, such that unoccupied or faulted channels can be present on the links 14 for optical power purposes. In an embodiment, the channel holder sources 20 can be ASE-based, modulated, unmodulated, etc. An objective is to fill in the spectrum on the links 14 initially so that each OMS section remains full-fill regardless of how many traffic channels are actually equipped. For example, the channel holder sources 20 can be injected locally to fill empty spectrum space, where there is no traffic signal present. When a traffic signal is provisioned or appears from an upstream node 12, the spectrum space is switched from the channel holder 20 to the traffic switch port to make adequate spectral space for the traffic signal.

With the spectrum at full-fill and the channel holder sources 20 being launched at the same power level as the traffic signals, the total power within each OMS link 14 remains constant; overcapacity changes that keep SRS, ripple, tilt, SHB impact on the OMS link 14 the same in the steady-state. The long chain of amplifiers 24, 26 can be either gain controlled or Total Output Power (TOP) controlled in their respective OMS link 14, i.e., on one OMS link 14, all amplifiers can be gain controlled, whereas, in the next OMS link 14, all amplifiers can be TOP controlled.

Channel Holder Failure Problem Definition

Figure 3:
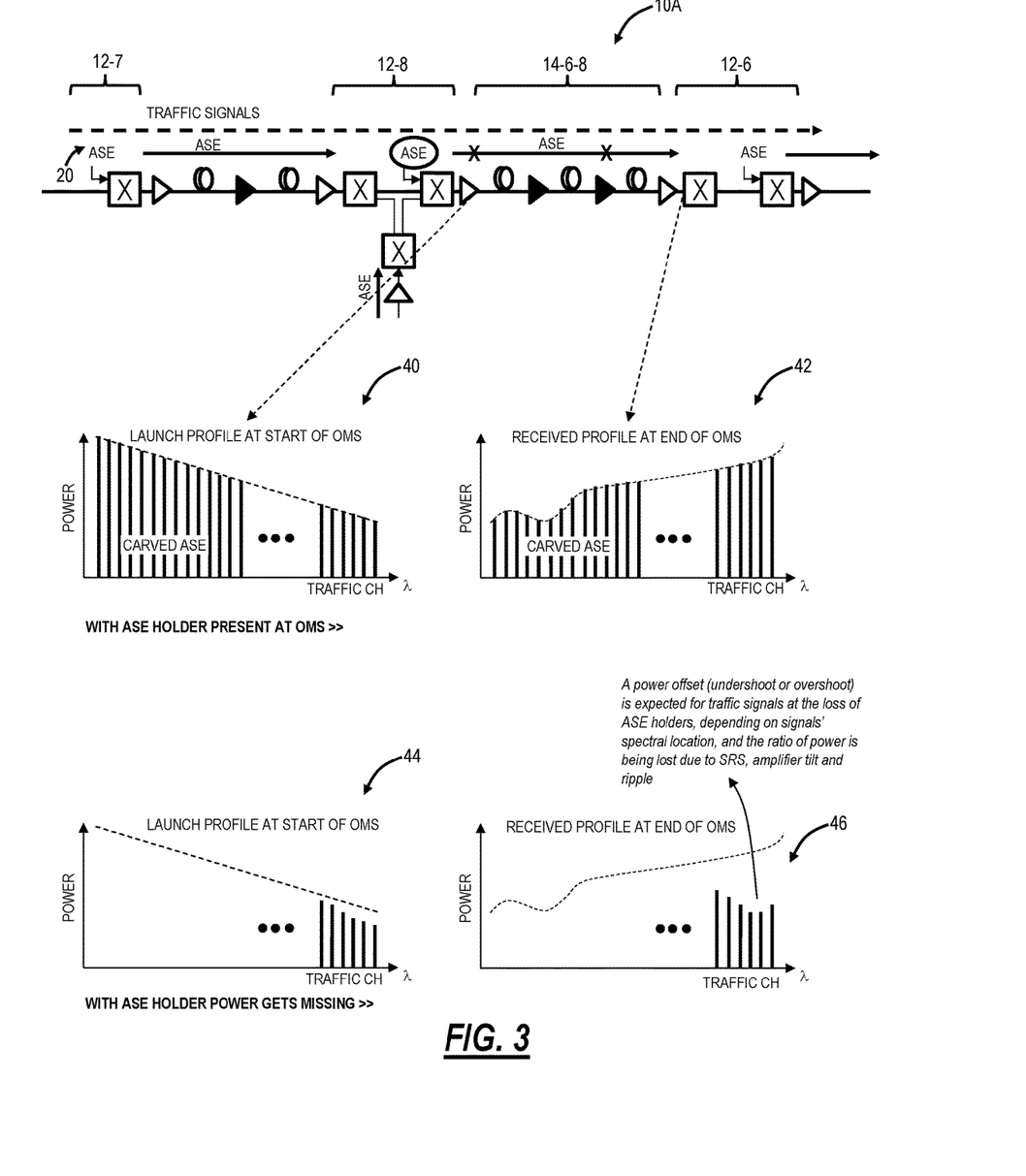
FIG. 3 is a network diagram of the portion of the optical network of FIG. 1 illustrating details associated with the failure of channel holders.

FIG. 3 is a network diagram of the portion 10A illustrating details associated with the failure of channel holder sources 20. Specifically, FIG. 3 includes four graphs 40, 42, 44, 46 illustrating optical spectrum power. The graph 40 illustrates a launch profile at the start of the OMS link 14-6-8 with the channel holder 20 operational, and the graph 42 illustrates a received profile at the end of the OMS link 14-6-8 with the channel holder 20 operational. The graph 44 illustrates a launch profile at the start of the OMS link 14-6-8 with the channel holder 20 faulted, and the graph 46 illustrates a received profile at the end of the OMS link 14-6-8 with the channel holder 20 faulted.

In channel holder based optical links, ASE-based channel holder sources 20 play the primary role to keep the optical spectrum profile agnostic to any capacity changes. The channel holder sources 20 move any capacity change action from an analog to digital operation, where the spectrum of interest filled with channelized ASE is switched with traffic signals. This is illustrated in the graphs 40, 42.

If the channel holder 20 dies, partially or fully for any reason, then that can potentially become traffic disrupting. This is illustrated in the graphs 44, 46. A power offset (undershoot or overshoot) is expected for traffic signals at the loss of the channel holder 20, depending on signals' spectral location, and the ratio of power is being lost due to SRS, amplifier tilt, and ripple. A drop in channel power for existing in-service traffic signals for a typical 5×-6× span section could be >6 dB that will drop signals' Optical Signal-to-Noise Ratio (OSNR) and can easily be traffic impacting. An increase in channel power for existing in-service traffic signals can cause non-linear penalties depending on fiber types and can be traffic impacting as well based on available margin on them.

The channel holder 20 fault can include, for example, a hardware level failure to loss all ASE power and channelized ASE holders, a partial level failure on the hardware (such as a failure of certain pumps responsible for ASE generation), a fiber cut or connector disruption between the channel holder 20 and the OADM multiplexer switch input port, etc.

Local Channel Holder Failure Detection and Replacement Process

Figure 4:
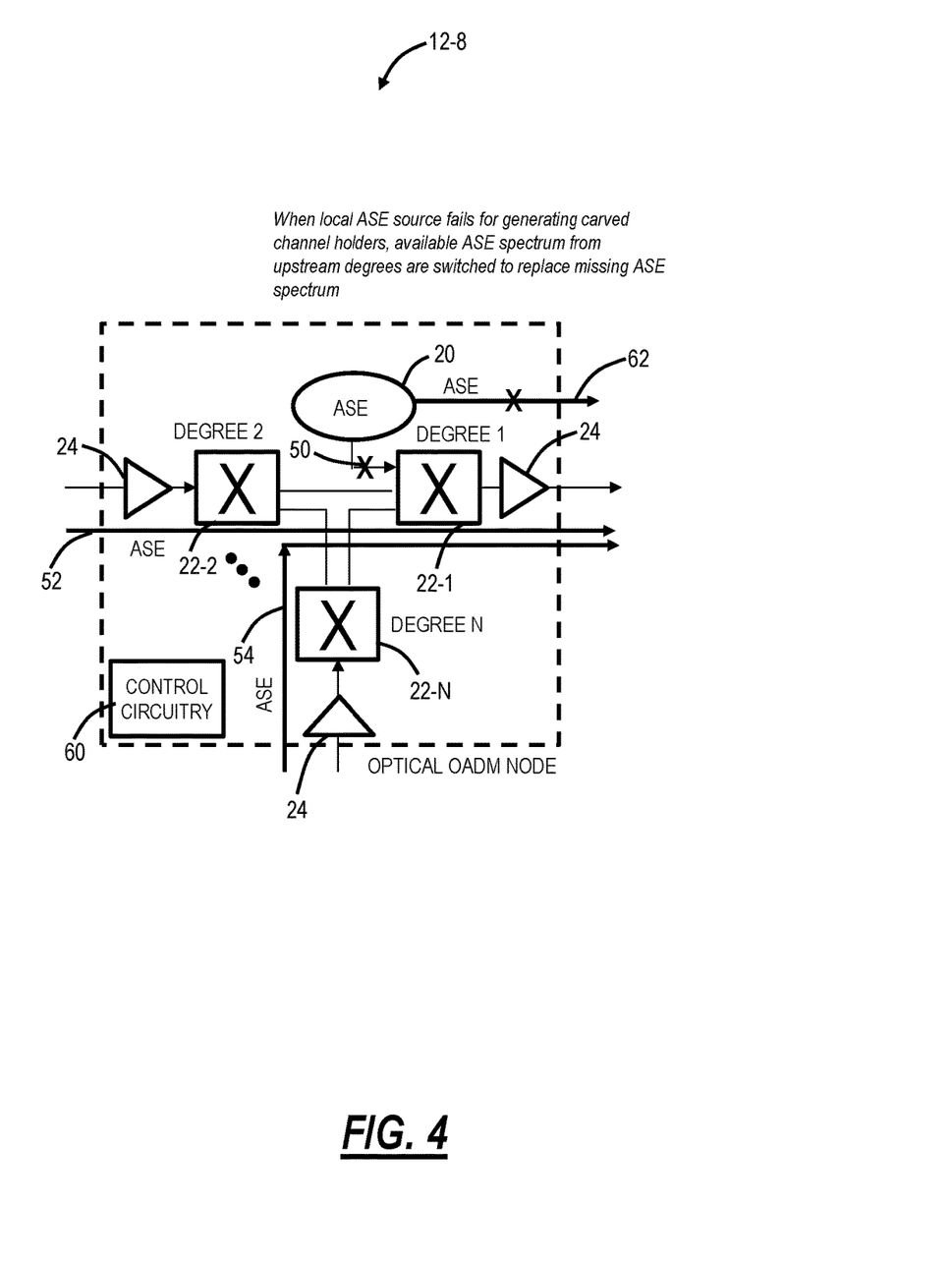
FIG. 4 is a block diagram of an OADM node for illustrating a local channel holder failure detection and replacement process.

FIG. 4 is a block diagram of an OADM node 12, specifically the OADM node 12-8 in the optical network 10 and the portion 10A, for illustrating a local channel holder failure detection and replacement process. Again, for illustration purposes, OADM node 12 is shown in a unidirectional configuration and those of ordinary skill in the art will recognize a practical embodiment includes complementary equipment in the opposite direction to form bidirectional connectivity. The OADM node 12 includes N degrees; each degree faces a corresponding OADM node 12. For example, FIG. 4 illustrates degree 1 formed by WSS 22-1 and facing the OADM node 12-6 (see FIGS. 1-3), degree 2 formed by WSS 22-2 and facing the OADM 12-7, and degree N formed by WSS 22-N facing the OADM 12-4. In the example, the degrees 2, N are receiving degrees whereas the degree 1 is a transmitting degree. Further, in this example, there is a channel holder source 20 connected to the WSS 22-1 for adding channel holders. There is received channel holder signals 52 and received channel holder signals 54 from the degrees 2, N, respectively. Also, in this example, it is assumed there is a failure in full or part of the channel holder source 20.

The OADM node 12 includes control circuitry 60 that can be communicatively coupled to various components, e.g., the WSSs 22-1, 22-2, 22-N, the channel holder source 20, etc. The control circuitry 60 can perform various functions during the operation of the OADM node 12. The local channel holder failure detection and replacement process addresses the failure in full or part of the channel holder source 20. Fault detection and control are local to the OADM node 12, i.e., no end-to-end communication dependency on other far end nodes or on any other nodes within an OMS link 14. This fault detection and control utilizes existing hardware and locally available resources, i.e., no additional or redundant hardware requirement (such as 1+1 protection). Specifically, in the event of a full or partial failure of the channel holder 20, the control circuitry 60, in combination with either the WSS 22-1 and/or the channel holder 20, detects a failure of the channel holder source 20, and replaces lost channel holder signals 62 from the failure of the channel holder source 20 with channel holder signals 52, 54 from upstream degrees.

For local failure detection, the control circuitry 60 looks for any of i) a Loss of Light (LOL) condition on the OADM mux switch input port (WSS 22-1) that defines a complete failure of the ASE channel holder source 20 or an internal fiber break with the channel holder source 20, ii) a communication or loss of communication from the channel holder source 20 to the control circuitry 60, iii) a drop in per channel power or Power Spectral Density (PSD) level for a subset of the channel holder signals from the channel holder source 20 at the OADM degree out compared to its target launch power profile by a certain threshold, AND an equivalent integrated power drop at the OADM mux switch in port. The approach iii) will catch silent pump failures from the channel holder source 20, causing a loss in the partial spectrum.

Subsequent to the local failure detection, the control circuitry 60 can cause replacement of the missing channel holder signals 62 by locally switching unoccupied spectrum filled with the channel holder signals 52, 54 from upstream towards the faulted degree (here, the degree 1). In the event of actual traffic in-service channels being provisioned in the upstream degree, the corresponding channel holder signals 52, 54 will be replaced with traffic signals on that degree, and the ASE that was being previously switched to the downstream degree to replace the missing "holder" spectrum, can be switched away to other degrees (unless those traffic channels are also intended for the same degree).

To avoid that sudden disruption of power in downstream degree with capacity changes in upstream, the approach can diversify sources from multiple upstream degrees if available so that in the event of an upstream failure or capacity changes in an upstream degree, only a fraction of "replaced" ASE spectrum gets impacted that eventually can be replaced by the local control circuitry 60 switching to other available degrees. Hence, more degrees available on an OADM node 12 will provide more opportunities to diversify the sources to replace "missing" ASE spectrum in a downstream degree.

To replace "missing" ASE spectrum from a plurality of upstream degrees, the control circuitry 60 decides on a portion of the missing spectrum that can be replaced from a specific degree, switches the upstream degree demultiplexer pixels (e.g., the WSS 22-2, 22-N) for the selected spectrum towards the downstream degree multiplexer (e.g., the WSS 22-1), and switches the downstream demultiplexer pixels for the selected spectrum towards the upstream demultiplexer degree and then uses a controlled power ramp to re-achieve target launch profile for the given ASE spectrum.

Following the replacement of missing ASE, the local control circuitry 60 raises an alarm if not already raised by the hardware for a silent failure. When the faulted channel holder source 20 is replaced, or power cycled, the local control circuitry 60 can perform a re-evaluation to check if the hardware is reporting any fault, and, if not, check if the total power at multiplexer switch input port is meeting the expectation. If this condition is true, the local control circuitry 60 switches back from upstream ASEs to local ASE by applying bundling, i.e., only a certain portion of the spectrum switching at a time to minimize any transient impact on traffic signals.

Example Operations

Figure 5:
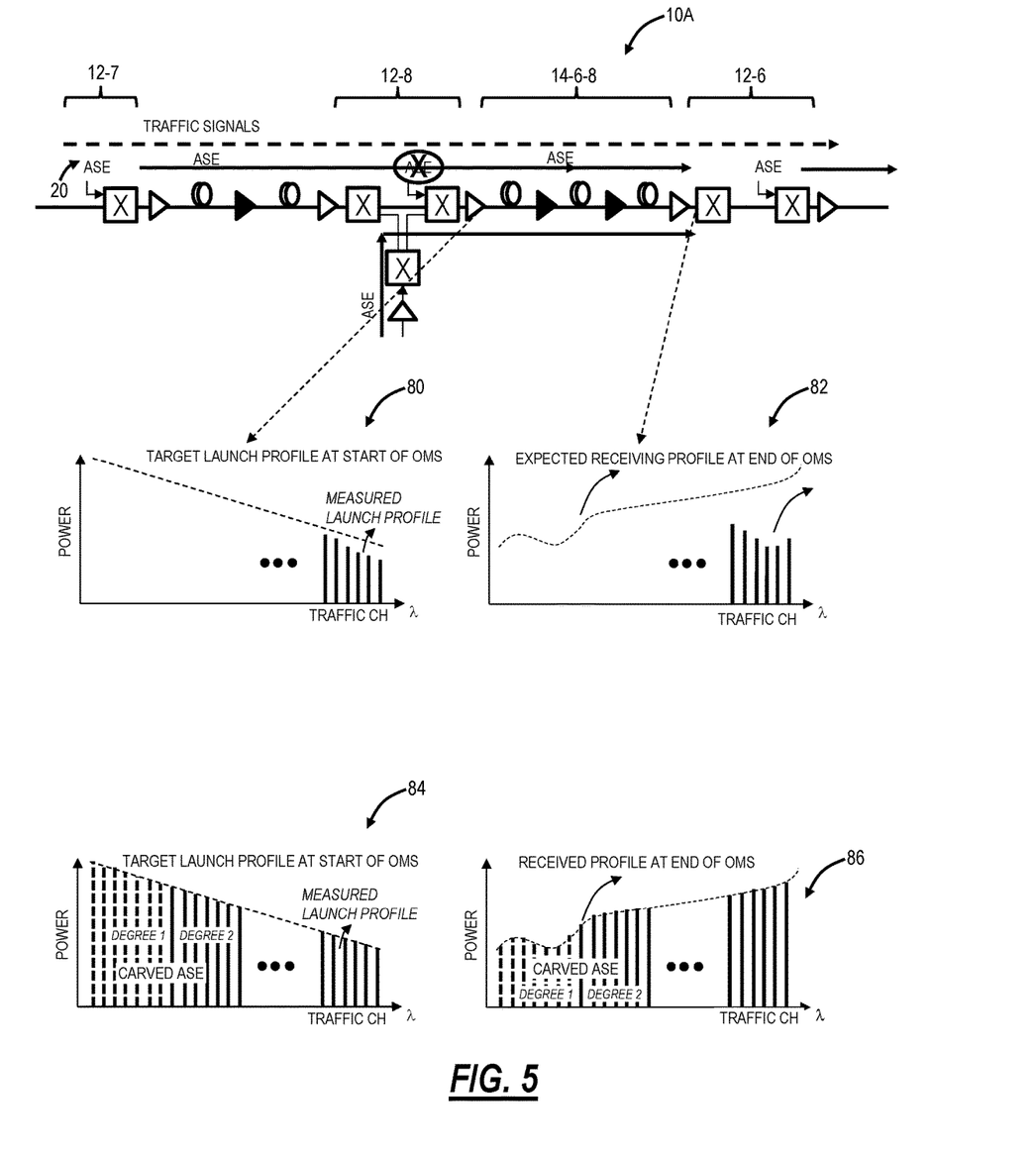
FIG. 5 is a network diagram of the portion of the optical network of FIG. 1 and graphs 80 illustrating details associated with a full failure of a channel holder.

FIG. 5 is a network diagram of the portion 10A of the optical network 10 and graphs 80, 82, 84, 86 illustrating details associated with a full failure of a channel holder 20. The graph 80 illustrates a launch profile at the start of the OMS link 14-6-8 with the channel holder 20 failed, i.e., there are only traffic channels, and the graph 82 illustrates a received profile at the end of the OMS link 14-6-8 with the channel holder 20 failed. In the graph 82, it is noted there is a power offset (undershoot or overshoot) expected for traffic signals at the loss of the channel holder 20, depending on signals' spectral location, and the ratio of power is being lost due to SRS, amplifier tilt and ripple.

The graph 84 illustrates a launch profile at the start of the OMS link 14-6-8 with the channel holder 20 faulted and with "carved ASE" switched from two other degrees, and the graph 86 illustrates a received profile at the end of the OMS link 14-6-8 with the channel holder source 20 faulted and with the "carved ASE" switched from two other degrees. As described herein, the control circuitry 60 detects the fault on the channel holder source 20 and replaces the corresponding channel holder signals by locally switching ASE from multiple upstream degrees to restore the missing ASE spectrum to their previous target launch power level and alleviate any power offset from existing traffic channels.

Figure 6:
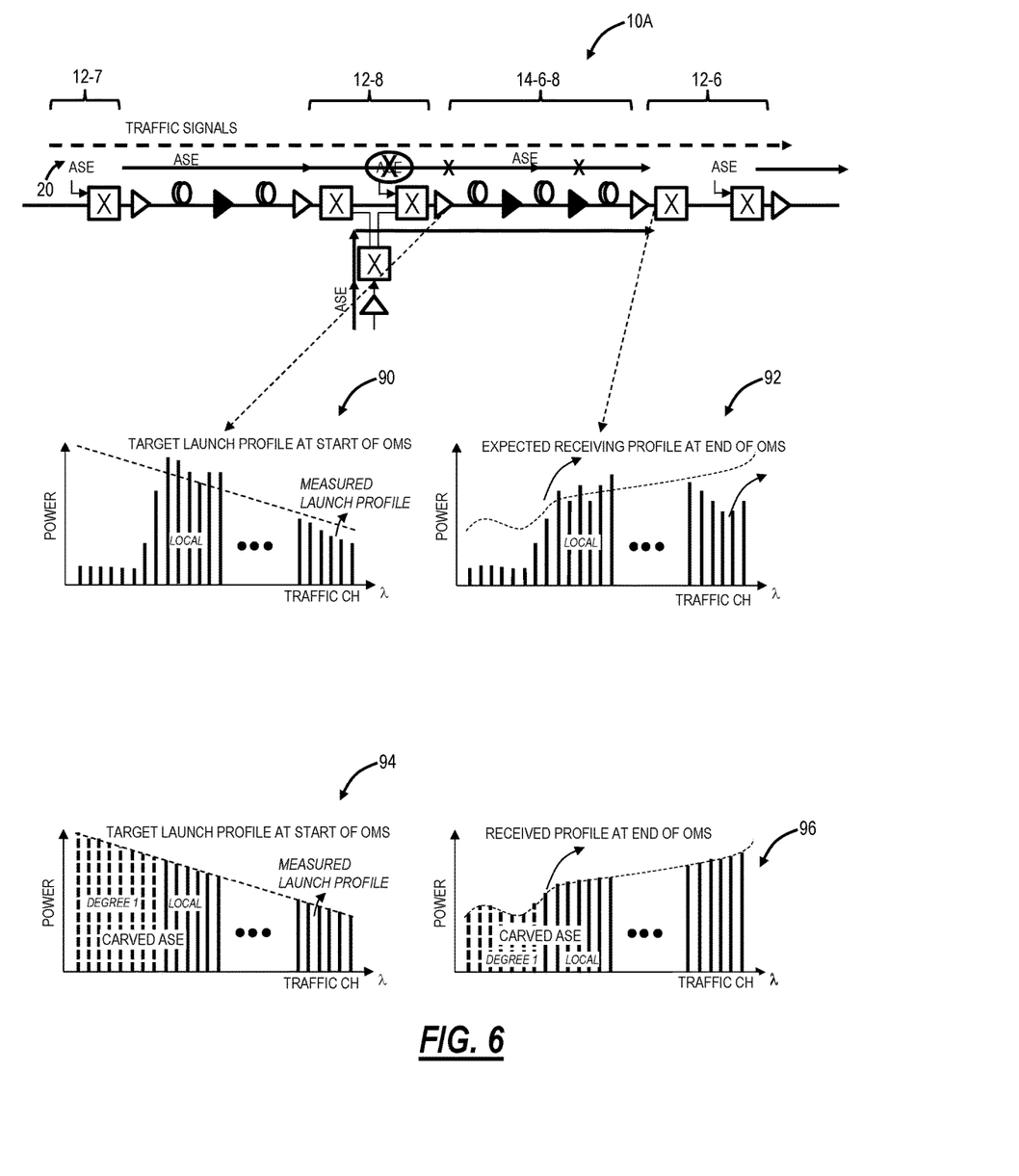
FIG. 6 is a network diagram of the portion of the optical network and graphs illustrating details associated with partial failure of a channel holder.

FIG. 6 is a network diagram of the portion 10A of the optical network 10 and graphs 90, 92, 94, 96 illustrating details associated with partial failure of a channel holder 20. The graph 90 illustrates a launch profile at the start of the OMS link 14-6-8 with the channel holder 20 partially failed, i.e., there can be a silent pump failure on the ASE channel holder source 20 that can trigger partial spectrum loss, and the graph 92 illustrates a received profile at the end of the OMS link 14-6-8 with the channel holder 20 partially failed. In the graph 92, it is noted there is a power offset (undershoot or overshoot) expected for traffic signals at the loss of the channel holder 20, depending on signals' spectral location, and the ratio of power is being lost due to SRS, amplifier tilt and ripple.

The graph 94 illustrates a launch profile at the start of the OMS link 14-6-8 with the channel holder 20 partially faulted and with "carved ASE" switched from one other degree, and the graph 96 illustrates a received profile at the end of the OMS link 14-6-8 with the channel holder source 20 partially faulted and with the "carved ASE" switched from one other degree. The control circuitry 60 detects the partial spectrum loss from channel holder source 20 by correlating total power change on degree line fiber facing output with power delta measured at mux switch input coming from the from channel holder source 20. The control circuitry replaces the lost channel holder signals by locally switching ASEs from multiple upstream degrees if available.

Deciding Spectrum from Upstream Degrees

For the sake of determining which spectrum to use from upstream degrees responsive to a channel holder source fault, note the total optically interconnected degrees in a node=N, Missing ASE spectrum from a given degree=X GHz Available upstream optically connected degrees=(N−1)

Expected spectral allocation for an upstream degree to replace missing $$ASE = \frac{X}{N-1} \text{ GHz}$$

For each upstream degree, find spectrum for which demultiplexer pixels are closed on the WSS 22. These are the unallocated spectrum filled with ASEs that can be used to replace missing ASE in a downstream degree. In this way, control circuitry 60 is finding spectrum from other degrees without relying on provisioned channel topologies, or logical spectral maps/cross-connects and hence, not relying on any centralized provisioned database for channel topology information.

An exhausted first fit approach can be used which starts with the first upstream degree and starts allocating first available $$\frac{X}{N-1} \text{ GHz } ASE$$

spectrum,

Move to next degree, and assign the next available spectrum slots,

May need to run multiple iterations over the available degrees to allocate more or less than $$\frac{X}{N-1} \text{ GHz}$$

if the required spectrum is not available from some congested degrees

Other approaches can be taken as well to find spectrum from upstream degrees such as best fit, worst fit, etc.

Broadcast and Select Architecture

Of note, channel holder-based OADM links are typically described with the route and select (R&S) based OADM structures to improve isolation for the downstream multiplexer. A route and select architecture can use the WSS 22 on both sides of the degrees, i.e., transmit and receive. However, it is also possible to enable channel holder based solution for broadcast and select (B&S) based OADM structure if downstream multiplexer port-to-port isolation specification can be improved. A broadcast and select architecture utilizes a WSS 22 on a transmit side (multiplexer) and a splitter on a receive side (demultiplexer).

In such a case, the approach will replace missing ASE with only ASE from upstream and not with other modulated traffic signals as that could generate additional non-linear penalties for existing traffic. Also, security becomes an issue for unwanted broadcasting of traffic. This approach relies on the provisioned channel topology or logical spectral maps/cross-connects on that node 12 to find available ASE spectrums from upstream degrees. In a broadcast and select OADM structure, since there is nothing to switch at the demultiplexer direction, the only switching required will be at the downstream multiplexer to switch away from local ASE source to an upstream degree.

End-to-End Control Approach

It is also possible to implement an end-to-end (e2e) controller approach, where a sectional controller will detect a failure on the channel holder source 20 and will reoptimize the link 14 by re-adjusting per channel and common gain/loss actuators to ensure existing traffic channels are re-achieving their launch profile in every span. However, since the spectral fill on the link 14 is not the same anymore, the SRS, and amplifier tilt on the link will not be the same either, and in some case, it may not be possible for the e2e controller to regain the old profile due to lack of dynamic ranges.

Note, an e2e controller approach for handling channel holder source 20 fault does not exist. However, similar controllers exist that can handle traffic outages for loss of signal on partial spectrum due to upstream fiber cuts. The e2e controller will have an end to end communication dependency in order for being able to communicate with each line elements within the optical link. When the fault with the channel holder source 20 is fixed, the controller will have to readjust the existing traffic channels, while introducing the channel holder sources 20 into the link again similar to new channel adds. Compared to an e2e controller approach, the proposed approach of handling the fault locally will be a far more robust solution and can recover traffic in seconds compared to 10's of seconds to minutes downtime with typical e2e controller approach.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Optical Add/Drop Multiplexer (OADM) node comprising:
a plurality of degrees each having a multiplexer and a demultiplexer configured to interface to an optical section in an optical network;
one or more channel holder sources configured to connect to corresponding multiplexers of the plurality of degrees and provide optical power at unoccupied portions of optical spectrum on the corresponding optical section to present a full-fill spectral loading condition thereon; and
control circuitry configured to
locally detect a failure on the one or more channel holder sources affecting a downstream degree, and
cause a switch of unoccupied optical spectrum filled with the channel holder signals from one or more upstream degrees to the downstream degree.

2. The OADM node of claim 1, wherein the control circuitry locally detects the failure that is a full failure based on a loss of light at an input port of one of the corresponding multiplexers.

3. The OADM node of claim 1, wherein the control circuitry locally detects the failure that is a partial failure by correlating total power change on degree line fiber facing output with a power delta measured at a switch input port of one of the corresponding multiplexers coming from the one or more channel holder sources.

4. The OADM node of claim 1, wherein the control circuitry switches the unoccupied optical spectrum filled with the channel holder signals from the one or more upstream degrees to the downstream degree in a controlled power ramp to achieve a target launch profile.

5. The OADM node of claim 1, wherein the one or more upstream degrees are a plurality of upstream degrees, and wherein the control circuitry switches the unoccupied optical spectrum filled with the channel holder signals from the plurality of upstream degrees to the downstream degree in a diversified manner.

6. The OADM node of claim 1, wherein the OADM node has N degrees with N≥2, the failure causes missing channel holder signals for X GHz, the one or more upstream degrees are N−1 degrees, and an expected spectral allocation from the N−1 degrees is $$\frac{X}{N-1} \text{ GHz.}$$

7. The OADM node of claim 1, wherein the one or more channel holder sources are any of Amplified Stimulated Emission (ASE) sources, modulated lasers, and unmodulated lasers.

8. The OADM node of claim 1, wherein, when a faulted channel holder source is replaced, the control circuitry is configured to check if the replaced channel holder source is reporting any fault and meeting expected total power at switch input port of the multiplexer, and then cause a switch back from the one or more upstream degrees to the replaced channel holder source by applying bundling.

9. A method comprising:
locally detecting a failure on one or more channel holder sources affecting an downstream degree in an Optical Add/Drop Multiplexer (OADM) node, wherein the one or more channel holder sources are configured to connect to corresponding multiplexers of degrees in the OADM node and provide optical power at unoccupied portions of optical spectrum on an optical section to present a full-fill loading condition thereon; and
switching unoccupied optical spectrum filled with the channel holder signals from one or more upstream degrees to the downstream degree.

10. The method of claim 9, wherein the locally detecting the failure that is a full failure is based on a loss of light at an input port of one of the corresponding multiplexers.

11. The method of claim 9, wherein the locally detecting the failure that is a partial failure includes correlating total power change on degree line fiber facing output with a power delta measured at an input port of one of the corresponding multiplexers coming from the one or more channel holder sources.

12. The method of claim 9, wherein the switching the unoccupied optical spectrum filled with the channel holder signals from the one or more upstream degrees to the downstream degree utilizes a controlled power ramp to achieve a target launch profile.

13. The method of claim 9, wherein the one or more upstream degrees are a plurality of upstream degrees, and wherein the switching the unoccupied optical spectrum filled with the channel holder signals from the one or more upstream degrees to the downstream degree is in a diversified manner.

14. The method of claim 9, wherein the OADM node has N degrees with N≥2, the failure causes missing channel holder signals for X GHz, the one or more upstream degrees are N−1 degrees, and an expected spectral allocation from the N−1 degrees is $$\frac{X}{N-1} \text{ GHz.}$$

15. The method of claim 9, wherein the one or more channel holder sources are any of Amplified Stimulated Emission (ASE) sources, modulated lasers, and unmodulated lasers.

16. The method of claim 9, further comprising:
replacing a faulted channel holder source;
checking if the replaced channel holder source is reporting any fault and meeting expected total power at switch input port of the multiplexer; and
causing a switch, based on the checking, back from the one or more upstream degrees to the replaced channel holder source by applying bundling.

17. An apparatus comprising
control circuitry in an Optical Add/Drop Multiplexer (OADM) node configured to communicate to i) a plurality of degrees each having a multiplexer and a demultiplexer configured to interface to an optical section in an optical network, and ii) one or more channel holder sources configured to connect to corresponding multiplexers of the plurality of degrees and to provide optical power at unoccupied portions of optical spectrum on the corresponding optical section to present a full-fill loading condition thereon, wherein the control circuitry is configured to
locally detect a failure on the one or more channel holder sources affecting an downstream degree, and
cause a switch of unoccupied optical spectrum filled with the channel holder signals from one or more upstream degrees to the downstream degree.

18. The apparatus of claim 17, wherein the control circuitry locally detects the failure that is a full failure based on a loss of light at an input port of one of the corresponding multiplexers.

19. The apparatus of claim 17, wherein the control circuitry locally detects the failure that is a partial failure by correlating total power change on degree line fiber facing output with a power delta measured at an input port of one of the corresponding multiplexers coming from the one or more channel holder sources.

20. The apparatus of claim 17, wherein the control circuitry switches the unoccupied optical spectrum filled with the channel holder signals from the one or more upstream degrees to the downstream degree in a controlled power ramp to achieve a target launch profile.

* * * * *